United States Patent
Yoon et al.

(10) Patent No.: US 7,519,019 B2
(45) Date of Patent: *Apr. 14, 2009

(54) METHOD OF RATE CONTROL

(75) Inventors: Young C. Yoon, San Diego, CA (US); Srinivasan Balasubramanian, San Diego, CA (US); David Reeves Comstock, San Diego, CA (US); Long L. Duan, San Diego, CA (US); Ralph Gholmieh, San Diego, CA (US); Thawatt Gopal, San Diego, CA (US); Patrick A. Hosein, San Diego, CA (US); Anthony C. K. Soong, Superior, CO (US); Shiau-He Shawn Tsai, San Diego, CA (US); Rath Vannithamby, San Diego, CA (US); Jonas Wiorek, San Diego, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 797 days.

This patent is subject to a terminal disclaimer.

(21) Appl. No.: 10/800,791

(22) Filed: Mar. 15, 2004

(65) Prior Publication Data
US 2005/0036458 A1 Feb. 17, 2005

Related U.S. Application Data

(63) Continuation-in-part of application No. 10/755,104, filed on Jan. 9, 2004.

(60) Provisional application No. 60/494,685, filed on Aug. 12, 2003.

(51) Int. Cl.
*H04Q 7/00* (2006.01)

(52) U.S. Cl. ............... 370/328; 370/311; 370/318; 370/348; 370/329; 455/453; 455/522; 455/509

(58) Field of Classification Search ............ 370/318, 370/328, 329, 331–335, 345, 348; 455/436–442, 455/450–453, 69, 522, 515–517, 445, 560–561
See application file for complete search history.

(56) References Cited

U.S. PATENT DOCUMENTS 5,528,593 A 6/1996 Dejaco et al.

(Continued)

FOREIGN PATENT DOCUMENTS

EP 0715431 6/1996

(Continued)

OTHER PUBLICATIONS

Hosein P et al: "On the tradeoff between throughput and fairness on the reverse link of a 3G CDMA network", GLOBECOM '04. IEEE Global Telecommunications Conference (IEEE CAT. No. 04CH37615) IEEE Piscataway, NJ, USA, vol. 6, 2004, pp. 3850-3854 vol., XP002338914.

(Continued)

*Primary Examiner*—Kamran Afshar
(74) *Attorney, Agent, or Firm*—Coats & Bennett, P.L.L.C.

(57) ABSTRACT

A radio base station performs reverse link rate control in a wireless communication network by "stealing" bits on a forward common power control channel. The forward common power control channel is divided into a plurality of frames, with each frame including a plurality of power control groups and each power control group including a plurality of power control slots. The radio base station may dynamically select power control slots depending on user demand to be used for reverse link rate control.

42 Claims, 6 Drawing Sheets

U.S. PATENT DOCUMENTS

| | | | |
|---|---|---|---|
| 6,134,220 A | 10/2000 | Delprat et al. | |
| 6,393,276 B1 * | 5/2002 | Vanghi | 455/422.1 |
| 6,477,502 B1 | 11/2002 | Dejaco et al. | |
| 6,831,910 B1 * | 12/2004 | Moon et al. | 455/522 |
| 6,975,604 B1 * | 12/2005 | Ishida et al. | 370/331 |
| 7,031,741 B2 * | 4/2006 | Lee et al. | 455/522 |
| 7,054,656 B2 * | 5/2006 | Zhou et al. | 455/522 |
| 7,346,314 B2 * | 3/2008 | Tsai et al. | 455/69 |
| 2002/0093918 A1 * | 7/2002 | Kim et al. | 370/329 |
| 2003/0026219 A1 * | 2/2003 | Moon et al. | 370/318 |
| 2003/0050084 A1 * | 3/2003 | Damnjanovic et al. | 455/522 |
| 2003/0067899 A9 * | 4/2003 | Chen et al. | 370/335 |
| 2003/0078010 A1 | 4/2003 | Davis | |
| 2003/0083093 A1 * | 5/2003 | Yun et al. | 455/522 |
| 2003/0117969 A1 * | 6/2003 | Koo et al. | 370/318 |
| 2003/0125037 A1 * | 7/2003 | Bae et al. | 455/450 |
| 2003/0130002 A1 * | 7/2003 | Chen et al. | 455/522 |
| 2004/0013103 A1 * | 1/2004 | Zhang et al. | 370/345 |
| 2004/0160914 A1 * | 8/2004 | Sarkar | 370/329 |
| 2004/0162098 A1 * | 8/2004 | Wei et al. | 455/522 |
| 2004/0242669 A1 | 12/2004 | Hosein | |
| 2004/0252669 A1 * | 12/2004 | Hosein | 370/318 |
| 2004/0258096 A1 * | 12/2004 | Yoon et al. | 370/498 |
| 2005/0025077 A1 * | 2/2005 | Balasubramanian et al. | 370/310 |
| 2005/0078629 A1 * | 4/2005 | Bi et al. | 370/329 |

FOREIGN PATENT DOCUMENTS

| | | |
|---|---|---|
| EP | 1231807 | 8/2002 |
| EP | 1 246 384 | 10/2002 |
| WO | WO02/35735 | 5/2002 |
| WO | WO 2004/045239 | 5/2004 |

OTHER PUBLICATIONS

Harri Holma and Antti Toskala: "WCDMA for UMTS," John Wiley & Sons, Ltd. 2000 XP002278973, p. 123-p. 127.

* cited by examiner

METHOD OF RATE CONTROL

RELATED APPLICATIONS

This application is a continuation-in-part of U.S. application Ser. No. 10/755,104 filed Jan. 9, 2004. This application also claims priority under 35 U.S.C. § 119(e) from Provisional Application Ser. No. 60/494,685 filed on Aug. 12, 2003. These applications are incorporated in their entirety by reference herein.

BACKGROUND OF THE INVENTION

The present invention generally relates to rate control methods for wireless communication systems.

In code division multiple access (CDMA) networks, the mobile stations share a reverse link channel and may transmit simultaneously on the reverse link channel. During transmission, each mobile station spreads its transmitted signal with a spreading code selected from a set of mutually orthogonal spreading codes. The base station is able to separate the signals received from the mobile stations by a correlation process. For example, if the base station desires to receive the signal transmitted by mobile station A, the base station correlates the received signal with the spreading code used by mobile station A to despread the signal from mobile station A. All other signals will appear as noise due to lack of correlation. The base station can despread signals from all other mobile stations in the same manner.

CDMA networks are interference-limited systems. Since all mobile stations operate at the same frequency, internal interference generated within the network plays a critical role in determining system capacity and signal quality. The transmit power from each mobile station contributes to the load at the base station and needs to be controlled to limit interference while maintaining desired performance objectives, e.g., bit error rate (BER), frame error rate (FER), capacity, dropped-call rate, coverage, etc. If the load is allowed to get too high, widespread outages may occur. An outage is considered to occur when the power required to maintain minimum signal quality standards is greater than the maximum transmit power of the mobile station.

Rate control is one technique used to control the load at a base station in a CDMA network. In general, the transmit power required to maintain a desired signal quality increases as the data transmission rate increases, and decreases as the data transmission rate decreases. When a mobile station is commanded to transmit at a particular data rate, the mobile station will transmit at the minimum power level needed to maintain acceptable signal quality standards. Thus, one way of controlling the load at the base station is to dynamically adjust the data transmission rates of the mobile stations.

Two well-known rate control techniques are common rate control and dedicated rate control. With common rate control and dedicated rate control, all mobile stations that need to transmit data in the reverse link are allowed to do so. Each mobile station initially begins transmitting at a specified minimum rate (sometimes called the autonomous rate) and then, depending on load of the base stations in its active set, is allowed to vary its transmission rate. The base stations periodically estimate the reverse link load and send rate control commands to the mobile stations. In common power control, a single rate control command is broadcast on a forward common power control channel and all mobile stations respond to the same rate control command. The rate control command typically comprises rate control bits, sometimes called reverse activity bits, that indicate to the mobile station 100 the link load experienced by the base station 36. In dedicated rate control, separate rate control bits are sent to each mobile station. In both common rate control and dedicated rate control systems, the mobile stations process the rate control bits and determine whether to increase, decrease or hold their current data transmission rates. When the mobile station changes its data transmission rate, it typically increases or decreases its data transmission rate to the next higher or next lower rate level defined by the applicable standard. Thus, the rate change is relative to the current data transmission rate of the mobile station.

SUMMARY OF THE INVENTION

The present invention relates to reverse link rate control for controlling the data transmission rate of mobile stations on a reverse link packet data channel. More particularly, the present invention relates to a method of transmitting rate control information from a radio base station to one or more mobile stations subject to reverse link rate control. The rate control information, which may comprise rate control bits, is inserted into a forward common power control channel. The forward common power control channel is divided into a plurality of frames. Each frame is further divided into a plurality of power control groups and each power control group comprises a plurality of power control slots. Selected power control slots on the forward common power control channel are allocated for reverse link rate control. The allocation of forward power control slots for reverse link rate control can be performed dynamically by the radio base station, or may be fixed. The present invention is useful for a variety of rate control methods, including common rate control, or a combination of common rate control and dedicated rate control.

DETAILED DESCRIPTION OF THE INVENTION

Figure 1:
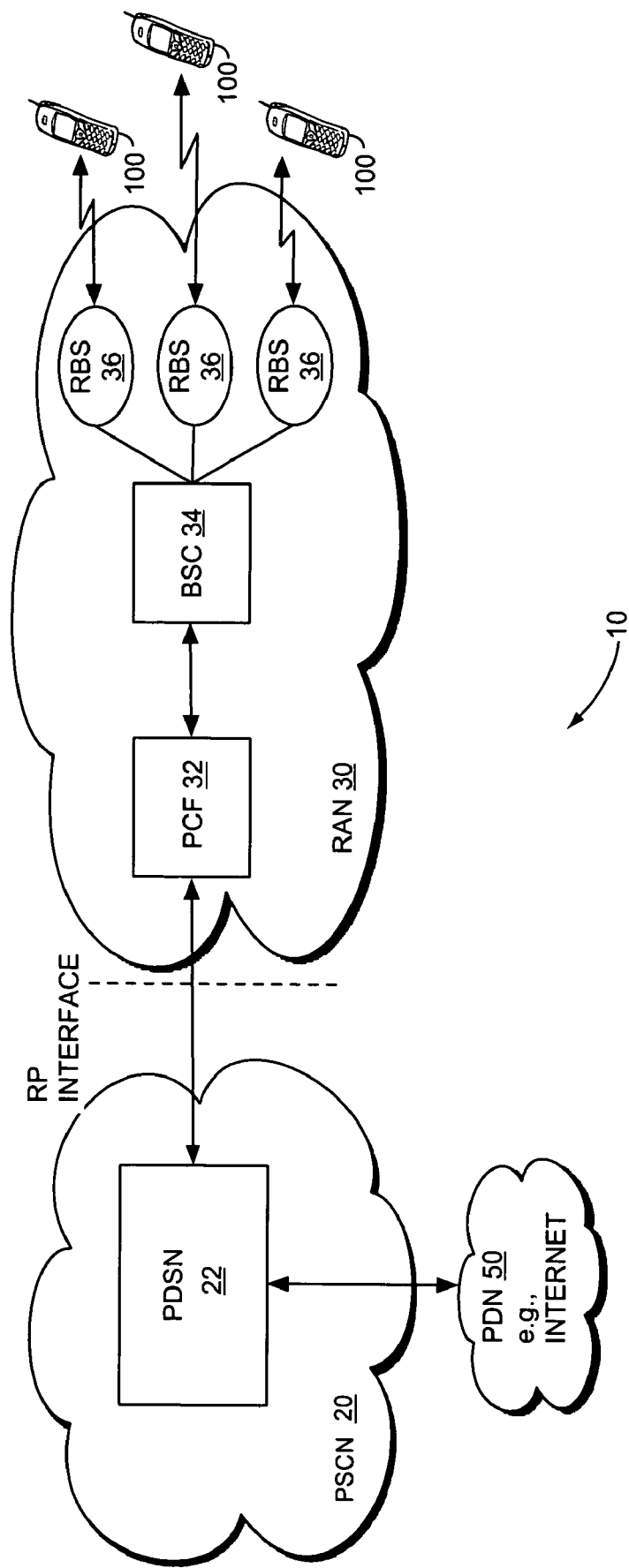
FIG. 1 is a diagram of an exemplary wireless communication network according to one or more embodiments of the present invention.

Turning to the drawings, FIG. 1 illustrates an exemplary wireless communication network 10 in which the present invention may be implemented. Network 10 may be any packet-switched communication network, for example, a cdma2000 wireless network according to the IS-2000/2001 families of standards. However, those skilled in the art will appreciate that the wireless communication network may be configured according to other standards, such as Wideband CDMA (WCDMA) standards, for example.

Network 10 includes a Packet-Switched Core Network (PSCN) 20 and a Radio Access Network (RAN) 30. The PSCN 20 provides connection to one or more Public Data Networks (PDNs) 50, such as the Internet. The PSCN 20 includes a packet data serving node (PDSN) 22, that connects with the RAN 30. The details of the PSCN 20 are not material to the present invention and, therefore, the PSCN 20 is not discussed further herein. The RAN 30 provides the radio interface between the mobile stations 100 and the PCSN 12. An exemplary RAN 30 comprises a Packet Control Function (PCF) 32, one or more Base Station Controllers (BSC) 34, and a plurality of Radio Base Stations (RBSs) 36. BSCs 34 connect the RBSs 36 to the PCF 32. Mobile stations 100 communicate with the RBSs 36 via the air interface as defined by the appropriate network standards, such as the IS-2000 family of standards.

Figure 2:
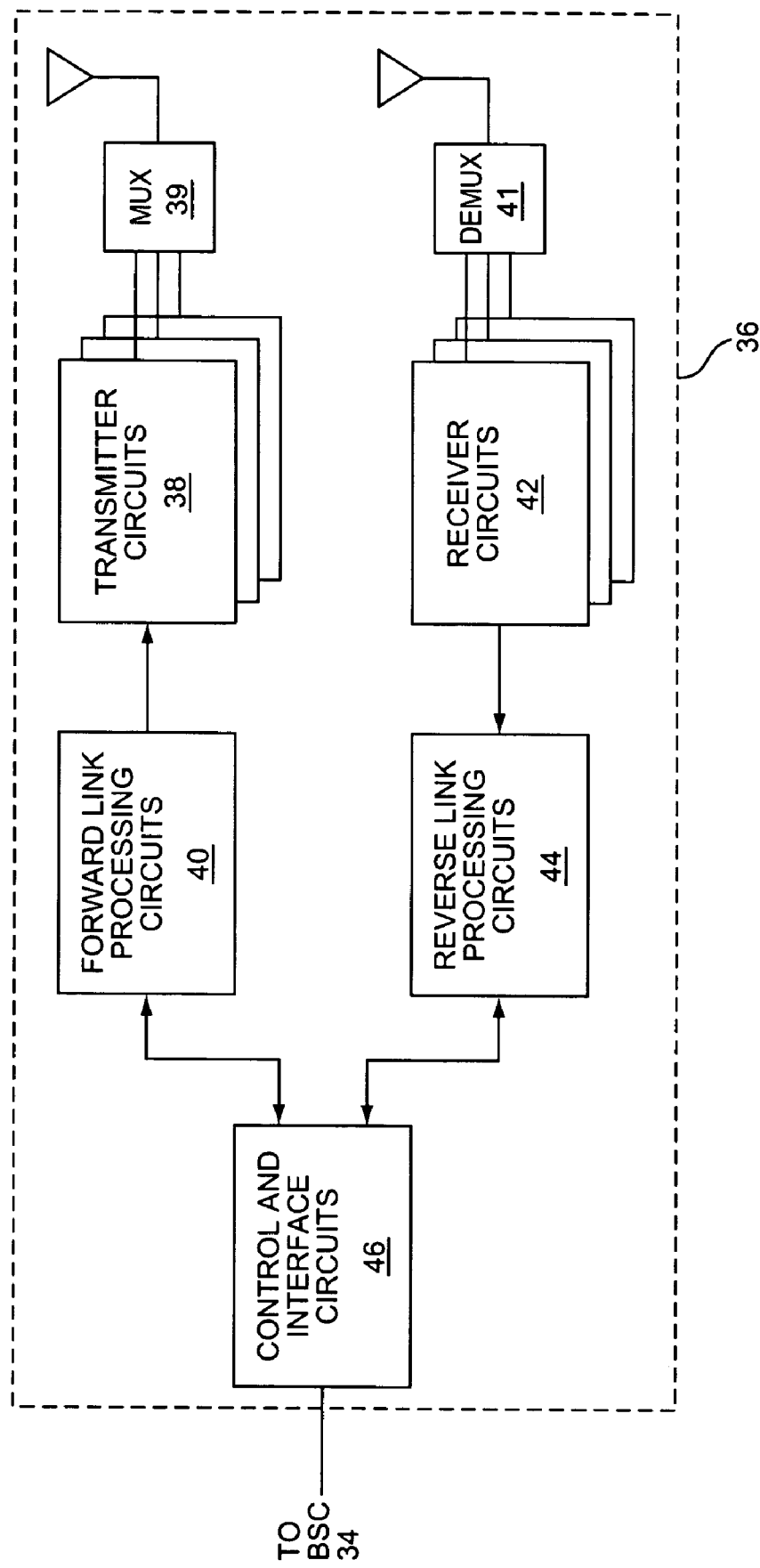
FIG. 2 is a diagram of exemplary functional details for a radio base station according to the present invention.

FIG. 2 illustrates a functional diagram of an exemplary RBS 36 according to one embodiment of the present invention. It will be appreciated that the present invention is not limited to the RBS architecture illustrated in FIG. 2, and that other RBS architectures are applicable to the present invention. The functional elements of FIG. 2 may be implemented in software, hardware, or some combination of both. For example, one or more of the functional elements in RBS 36 may be implemented as stored program instructions executed by one or more microprocessors or other logic circuits included in RBS 36.

As shown in FIG. 2, RBS 36 includes transmitter circuits 38, forward link signal processing circuits 40, receiver circuits 42, reverse link signals processing circuits 44, and control and interface circuits 46. The transmitter circuits 38 include the necessary RF circuits, such as modulators and power amplifiers, to transmit signals to mobile stations 100. Multiplexer 39 connects the transmitter circuits 38 to one or more transmit antennas. The forward link signal processing circuits 40 process the signals being transmitted to the mobile stations 100. Forward link signal processing may include digital modulation, encoding, interleaving, encryption, and formatting. The receiver circuits 42 comprise the RF components, such as a receiver front end, necessary to receive signals form the mobile stations 100. Demultiplexer 41 connects the receiver circuits 42 to one or more receive antennas. Reverse link processing circuits 44 process the signals received from the mobile stations 100. Reverse link processing may include, for example, digital demodulation, decoding, de-interleaving, and decryption. Control and interface circuits 46 coordinate the operation of the RBS 36 and the mobile stations 100 within the applicable communication standards and interface the RBS 36 with the BSC 34. The forward link processing circuits 40, reverse link processing circuits 44, and control and interface circuits 46 may be integrated in a single processor, or may be implemented in multiple processors, hardware circuits, or a combination of processors and hardware circuits.

Figure 3:
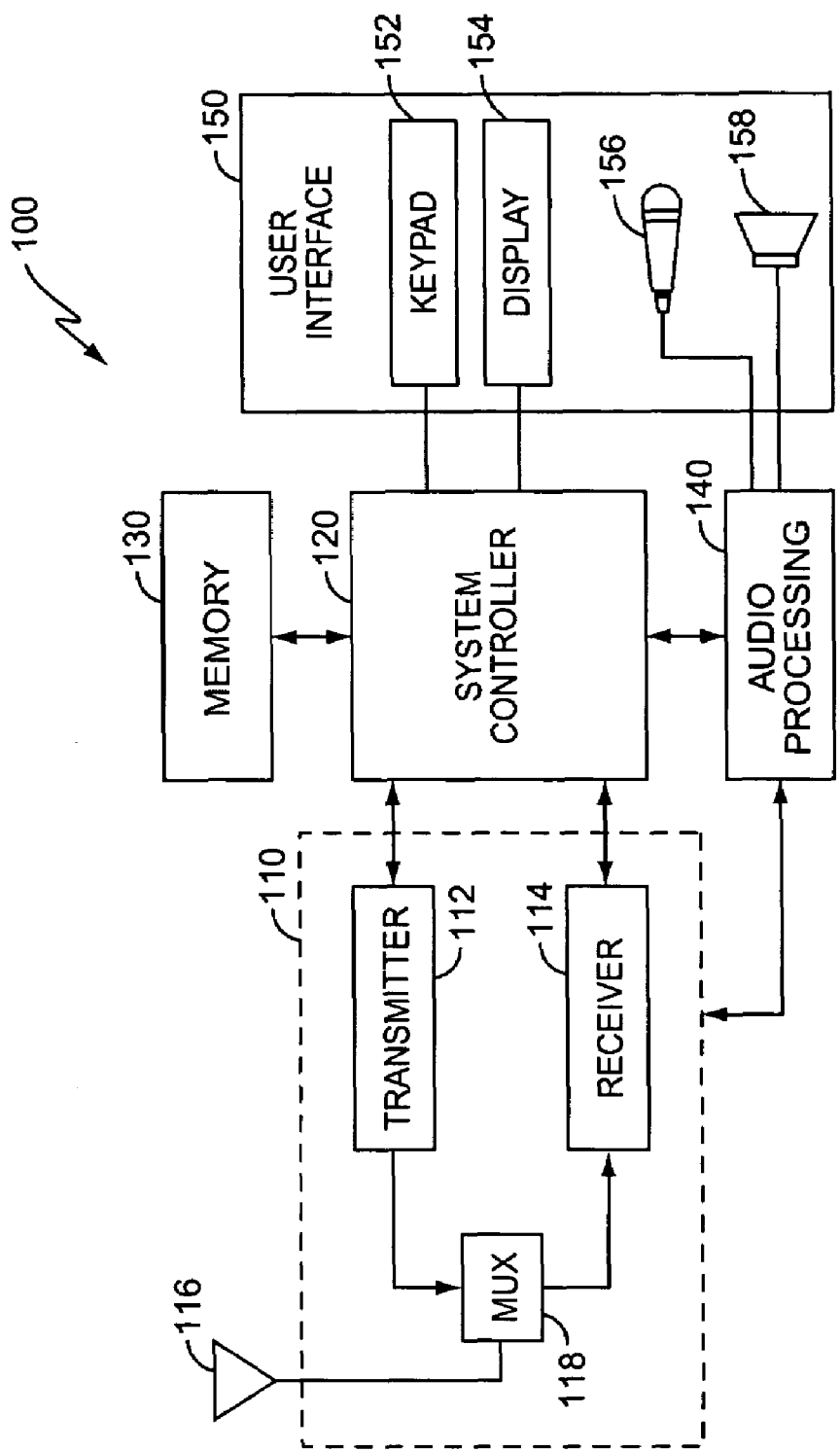
FIG. 3 is a functional block diagram of an exemplary mobile station according to the present invention.

FIG. 3 is a functional block diagram of an exemplary mobile station 100. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 120 via a multiplexer 130 as known in the art. Mobile station 100 further includes a system controller 140, and a user interface 150. Transceiver 110 includes a transmitter 112 and a receiver 114. Transceiver 110 may, for example, operate according to the cdma2000, WCDMA or UMTS standards. The present invention, however, is not limited to use with these standards and those skilled in the art will recognize the present invention may be extended or modified for other standards.

System controller 140 provides overall operational control for the mobile station 100 according to programs instructions stored in memory. System controller 140 may comprise a microprocessor or microcontroller and may be part of an application specific integrated circuit (ASIC). Memory represents the entire hierarchy of memory in a mobile station 100. Memory provides storage for data, operating system programs and application programs. Memory may be integrated with the system controller, or may be implemented in one or more discrete memory devices.

User interface 150, typically comprising a keypad 152, display 154, microphone 156 and/or speaker 158. Keypad 152 allows the operator to enter commands and select menu options while display 154 allows the operator to see menu options, entered commands, and other service information. Microphone 156 converts the operator's speech into electrical audio signals and speaker 158 converts audio signals into audible signals that can be heard by the operator. It will be understood by those skilled in the art that mobile station 100 may comprise a subset of the illustrated user interface elements or mobile station 100 may comprise additional user interface elements not shown or described herein.

In cdma2000 networks, reverse link power control is used to control the transmit power of the mobile stations 100. The general goal of reverse link power control is to maintain the transmit power level of the mobile station at the minimum level required to maintain signal quality objectives at the current data transmission rate of the mobile station 100.

RBS 36 controls the transmit power level of the mobile stations 100 using closed loop power control. The closed loop power control mechanism includes an inner power control loop and an outer power control loop. The inner power control loop adjusts the mobile station transmit power to maintain the signal to noise ratio (SNR) of the reverse pilot channel (R-PICH) as close as possible to a targeted power control set point. The outer loop power control mechanism adjusts the power control set point for a given mobile station 100 depending on frame error rate (FER) or some other performance metric.

To perform inner loop power control, the RBS 36 periodically measures the received signal strength of the R-PICH from the mobile station 100, computes the SNR of the R-PICH, and compares the computed SNR of the R-PICH to the power control set point. The RBS 36 transmits a power control bit (PCB) to the mobile station 100 depending on the outcome of the comparison. If the measured SNR is above the power control set point, the RBS 36 transmits a "1." Conversely, if the measured SNR is below the power control set point, the RBS 36 transmits a "0." A PCB having a value of "1" is interpreted by the mobile station 100 as a command to decrease its transmit power level by δ dB. Similarly, a PCB having a value of "0" is interpreted by the mobile station 100 as a command to increase its transmit power by δ dB. Thus, the mobile station 100 adjusts its transmit power up or down by δ dB for each power control bit. There is no command to maintain the current transmit power level. A relatively constant transmit power level, however, may be maintained by transmitting alternating up and down commands from the RBS 36 to the mobile station 100.

Figure 4:
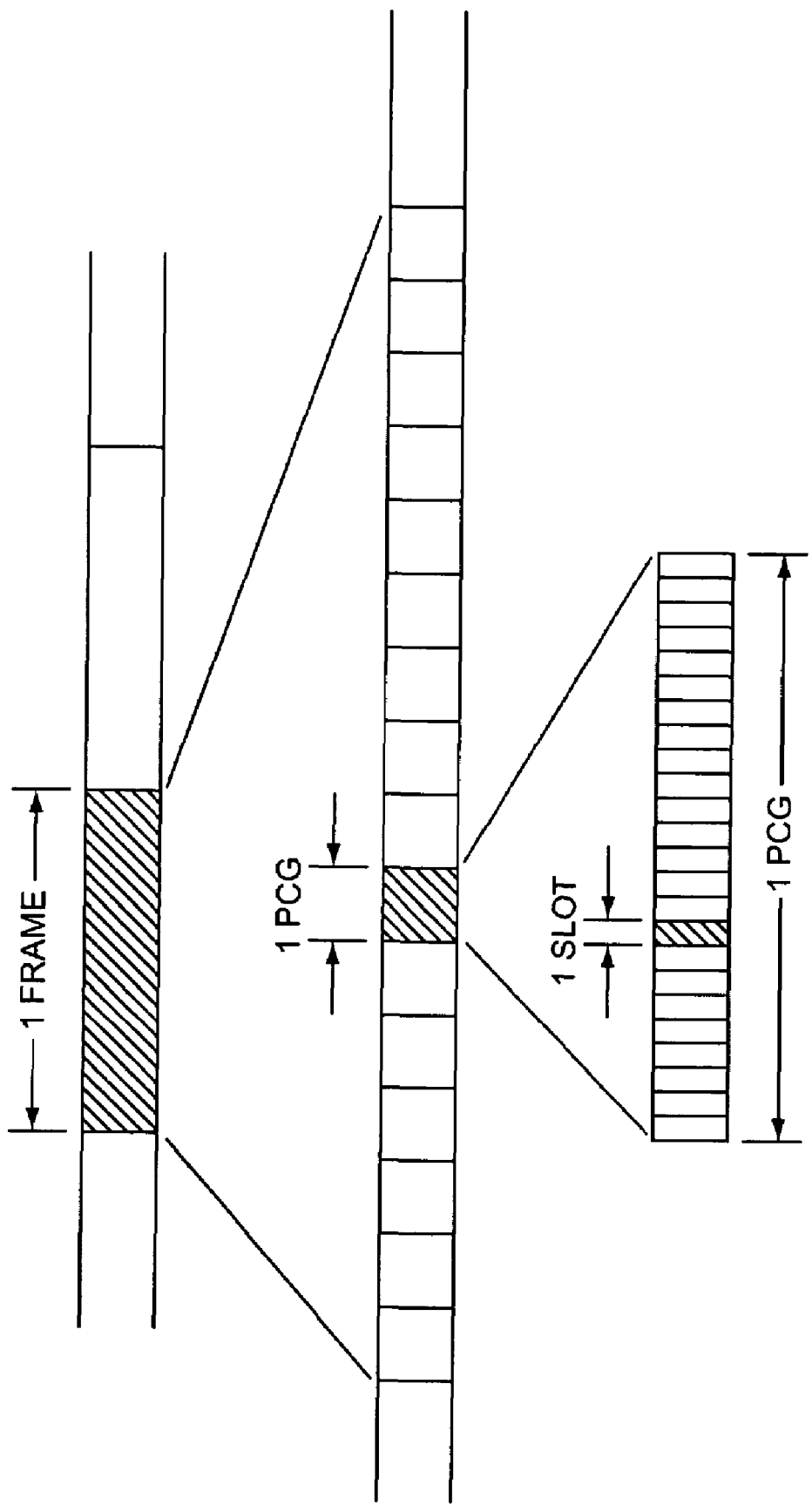
FIG. 4 is a diagram illustrating the structure of the Common Power Control Channel (CPCCH).

The RBS 36 transmits power control bits (PCBs) to the mobile station 100 on either a fundamental channel (FCH) if one is assigned or a forward common power control channel (F-CPCCH). The F-CPCCH is illustrated in FIG. 4. The RBS 36 transmits continuously and at constant power on the F-CPCCH. In the current cdma2000 standard, the F-CPCCH is organized into 20 ms frames. Each 20 ms frame is further subdivided into sixteen equal time intervals of 1.25 ms each, which are known as power control groups (PCGs). Thus, a single forward link frame has sixteen PCGs. Each PCG includes 24 slots. Each slot contains 1 bit. One slot of each PCG is used to power control one mobile station 100. Thus, the RBS 36 can power control 24 mobile stations 100 at a rate of 800 Hz using a single F-CPCCH.

Because the relationship between SNR and frame error rate is non-linear, the RBS 36 may adjust the power control set point depending on factors such as vehicle speed and channel conditions. In general, performance as measured by FER deteriorates with increasing vehicle speed. Thus, the outer power control loop at the RBS 36 periodically adjusts the set point to maintain the signal quality as measured by the FER at a desired target FER value. For outer loop power control, the RBS 36 measures the FER of the R-PDCH.

Rate control is also used to control the reverse link load at the RBS 36. With rate control, the RBS 36 controls the data transmission rates of the mobile stations 100 on the reverse link traffic channels to maintain the reverse link load at the RBS 36 at a desired level. The general aim of common rate control is to maintain the reverse link load as close as possible to a desired target load so that the number of outages is maintained at an acceptable level, e.g. 1% while utilizing the reverse link channel to the fullest extent possible. In many common rate control and dedicated rate control schemes, mobile stations 100 that have data to transmit are allowed to transmit. Initially, a mobile station 100 begins transmitting at a very low rate called the autonomous rate, which may for example be a rate of 9.6 kbps. After a mobile station 100 begins transmitting data, it is allowed to vary its transmission rate depending on reverse link load.

In common rate control, the RBS 36 periodically estimates the reverse link load and transmits a load indication to all of the mobile stations 100 transmitting on the reverse link channel. The RBS 36 transmits the load indication to all mobile stations 100 over a common control channel. Each mobile station 100 decides whether to increase or decrease its transmission rate based at least in part on the load indication from the RBS 36. Rate adjustment decisions by the mobile stations 100 will tend to follow the load indications from the RBS 36. If the reverse link load at the RBS 36 increases above the target load, the mobile stations 100 in general will decrease their transmission rate to reduce the reverse link load. Conversely, if the reverse link load at the RBS 36 decreases below the target load, the mobile stations 100 in general will increase their transmission rate to increase the load and more efficiently use the reverse link channel. The rate adjustment decision of an individual mobile station 100, however, may not follow the load indication at a given time instant, since other factors (e.g., user class, QoS information, power limitations, etc.) may be evaluated in making rate control decision.

Figure 5:
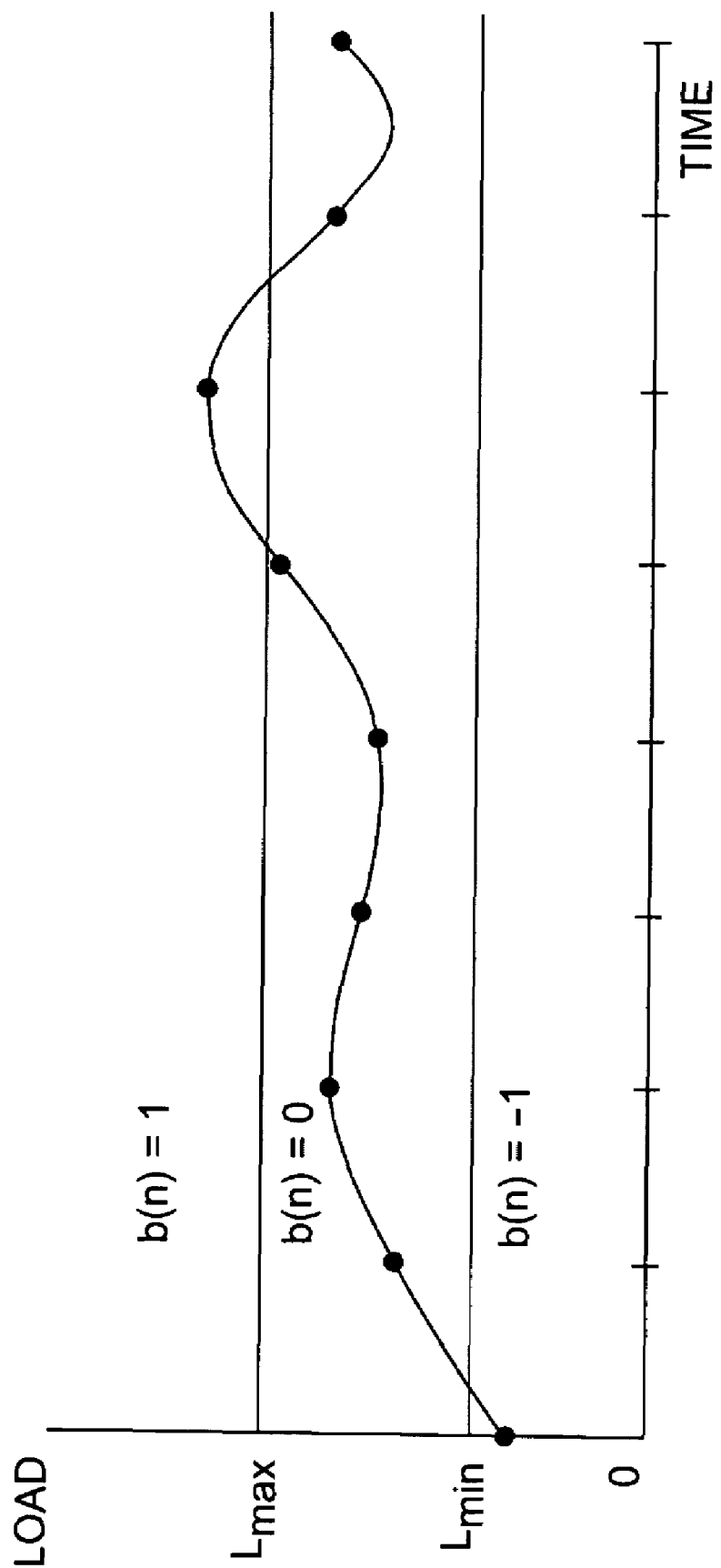
FIG. 5 illustrates an exemplary load curve for a base station using common rate control or dedicated rate control according to the present invention.

FIG. 5 is a graph illustrating one method of determining the load indication. In FIG. 5, the vertical axis represents the reverse link load, and the horizontal axis represents time. $L_{MAX}$ is the maximum load beyond which the system is unstable and outages are likely to occur. $L_{MIN}$ is the load below which the system is considered lightly loaded. Thus, the range of possible load values is divided into three regions. While three regions are shown in the exemplary embodiment, the load range may be divided into any number of regions greater than or equal to two.

During operation the RBS 36 periodically estimates the reverse link load and determines the load indication to broadcast to the mobile stations 100 transmitting on the reverse link based on the region wherein the current load estimate falls. The evaluation period may be once per frame. Evaluation periods longer or shorter than once per frame are also within the scope of the invention. If L(n) denotes the estimate of the reverse link load at the nth evaluation period, the RBS 36 may determine the corresponding load indication b(n) as follows:

if $(L(n)>=L_{MAX})\{\text{set} b(n)=1\}$ else if $(L(n)<=L_{MIN})\{\text{set} b(n)=-1\}$ else $\{\text{set} b(n)=0\}$      Eq. 1

The load indication b(n) may comprise, for example, one or more load indication bits, which are sometimes referred to as reverse activity bits (RABs) but are referred to herein generically as rate control bits. For purposes of this application, the term "rate control bits" means any bits transmitted from the base station that are used by a mobile station 100 to determine its data transmission rate. As noted above, the rate control bits may comprise load indication or reverse activity bits or may comprise explicit up/down commands.

The mobile stations 100 determine whether to change their data transmission rate based at least in part on the rate control bits transmitted by the RBS 36. The rate determination process performed by the mobile station 100 is not material to the present invention, but illustrative methods are described herein to provide an exemplary context for the present invention as an aid in understanding the invention. In the embodiment shown in FIG. 5, the mobile station 100 may interpret the rate control bits as an explicit command to either increase, decrease, or hold its current data transmission rate. For example, the mobile station 100 may interpret a "1" as a command to increase the data transmission rate to the next higher rate level, and interpret a "-1" as a command to decrease the current data transmission rate to the next lower rate level. A "0" may be interpreted as a command to hold the current data transmission rate.

Alternatively, the mobile station 100 could filter the load indications and change its data transmission rate probabilistically based on the filtered value. For example, the mobile station 100 may determine a rate change probability q based on the filtered value of the load indications and change rate with a probability determined by the rate change probability q. Consequently, some number of mobile stations 100 will change rates, and some other number of mobile stations will continue to transmit at their current rate. Techniques for probabilistically changing data transmission rates are described in the U.S. applications titled "Common Rate Control Method for Reverse Link Channels in CDMA Networks" filed on Nov. 21, 2003, and "Common Rate Control Method Based On Mobile transmit Power" filed on Nov. 21, 2003. Both of these applications are incorporated herein by reference.

In dedicated rate control, the RBS 36 estimates the reverse link load and determines rate control bits to send to each mobile station 100. Dedicated rate control differs from common rate control in that separate rate control bits are sent to each mobile station 100. The mobile station 100 may interpret the rate control bits the same as for common rate control. Thus, from the perspective of the mobile station 100, dedicated rate control is the same as common rate control.

Common rate control and dedicated rate control require no rate feedback information from the mobile stations 100 to the RBS 36. Further, in common rate control the RBS 36 broadcasts load indications to all mobile stations 100 on a common control channel. Consequently, common rate control and dedicated rate control require only a low signaling overhead and are low in implementation complexity.

To perform either common rate control or dedicated rate control, the RBS 36 needs to send rate control bits to the mobile stations 100. The rate control bits are preferably transmitted over a common control channel. It is possible, for example, to define a dedicated channel or subchannel on a forward control channel for the purpose of transmitting rate control bits. If a dedicated rate control channel were used, however, the size or bandwidth of the rate control channel would need to be conservatively estimated to accommodate the largest number of expected users. Thus, during periods of low usage, the dedicated rate control channel would be underutilized and the resources allocated for rate control would remain idle. It would be preferable if the resources allocated for rate control could be used for other purposes during periods of low usage.

According to one exemplary embodiment of the present invention, rate control bits are transmitted to the mobile stations 100 over the F-CPCCH. Even when a mobile station 100 is assigned a FCH and receives its PCBs on the FCH, the rate control bits may be transmitted to the mobile station 100 on the F-CPCCH. The RBS 36 may dynamically allocate slots on the F-PCCH not currently used for power control and uses the selected slots to transmit rate control bits to one or more mobile stations 100. In effect, the RBS 36 "steals" bits from the F-CPCCH to use as a rate control subchannel. In another embodiment of the invention, one or more predetermined slots on the F-CPCCH may be designated for rate control, to which mobile stations 100 can then be dynamically assigned. Borrowing slots on the F-CPCCH to transmit rate control bits either reduces the number of mobile station 100 that can be power controlled or reduces the effective rate at which power control occurs.

Figure 6A:
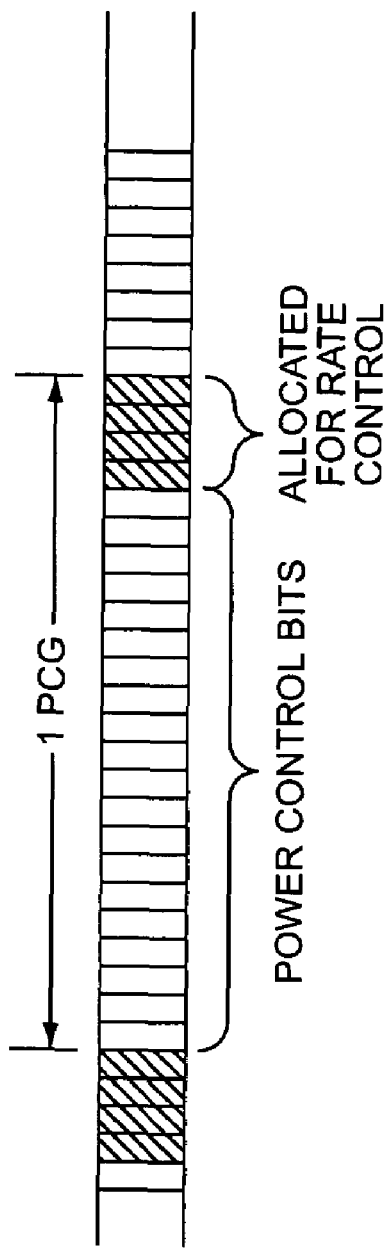
FIGS. 6A and 6B are diagrams illustrating various methods of inserting common power control bits into a Forward Common Power Control Channel.
Figure 6B:
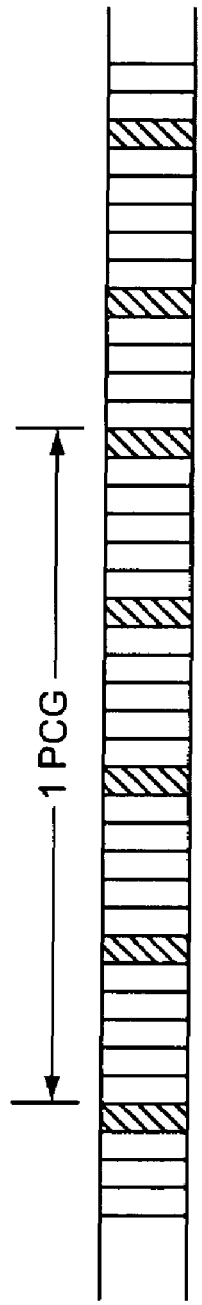

FIGS. 6A and 6B illustrate two exemplary methods of allocating slots on the F-CPCCH for use as a rate control subchannel. Other methods may also be employed. In FIG. 6A, the RBS 36 has allocated the same slots in each PCG for rate control. In the specific example, the last four slots in each PCG are allocated for rate control, though it is not required that consecutive slots be assigned. The selected PCG slots may be distributed rather than consecutive. The remaining 20 PCG slots in each PCG may continue to be used for power control. As noted above, this allocation may be done dynamically as the need for additional rate control resources arises. Using this method of allocation, the RBS 36 may power control up to 20 mobile stations 100 at a rate of 800 Hz without any modification in the power control algorithm of the mobile station 100. The mobile stations 100 need not be aware that some PCG slots are being used for rate control since different PCG slots are allocated for rate control and power control respectively.

Alternatively, the RBS 36 could allocate PCG slots for rate control as shown in FIG. 6B. In FIG. 6B, four slots in each PCG are allocated for rate control, but the slots used for rate control are not the same in all PCGs. In this example, the PCG slots allocated for rate control shift one position in each consecutive PCG. Using this method of allocation, the RBS 36 may power control 24 mobile stations 100 at a rate of 600 Hz. Each mobile station 100 in such case would be assigned a PCG slot for power control (e.g. the first slot in each PCG) as is done conventionally and would ignore every sixth PCG yielding an effective power control rate of 600 Hz. Again, the allocation of PCG slots for rate control may be performed dynamically. For example, the RBS 36 may allocate a fixed number of slots per frame each time additional rate control resources are needed. Thus, the RBS 36 may initially allocate 8 slots (every 24th slot); then 16 slots (every 12th slot), etc.

Another alternative is to allocate all slots from a single PCG in each frame for rate control. As in the previous example, the mobile stations 100 may be programmed to ignore the PCG designated for rate control for purposes of power control.

Where common rate control is used by the RBS 36 to control the reverse link load, the number of PCG slots that need to be "borrowed" for rate control is small. In one exemplary embodiment, the RBS 36 transmits a load indication to the mobile stations 100 at a rate of 50 Hz. The load indication comprises two rate control bits, which enables the RBS 36 to indicate up to four different load levels. The rate control bits are repeated four times to protect against bit errors that may occur during transmission. Thus, eight bits per 20 ms frame or 0.5 bits per PCG are required to obtain a rate of 50 Hz. The RBS 36 could transmit the rate control bits in a selected slot in every other PCG as shown in FIG. 6A, or could evenly distribute the rate control bits at every 48th PCG slot as shown in FIG. 6B.

When dedicated rate control is desired, the RBS 36 would need to allocate eight slots for each mobile station 100 that is being rate controlled assuming that a two-bit load indication is transmitted at a rate of 50 Hz and is repeated four times. If four PCG slots are allocated from each PCG as shown in FIGS. 6A and 6B, the RBS 36 could rate control eight mobile stations 100. The RBS 36 could dynamically allocate more PCG slots for dedicated rate control if required; reducing the number of slots allocated for rate control when circumstances allow.

The RBS 36 could also perform a mixture of common rate control and dedicated rate control. For example, the RBS 36 may allocate eight PCG slots for common rate control as previously described and dynamically allocate PCG slots for dedicated rate control as needed. The RBS 36 selects dedicated or common power control for each mobile station 100 depending on the application and other requirements, such as QoS, etc.

The RBS 36 identifies the rate control subchannel to the mobile station 100 in an upper layer signaling message at call setup and during a soft/softer handoff.

The rate control subchannel may be communicated to the mobile station 100 in a message transmitted during call set-up or during a soft/softer handoff. In systems that employ common rate control, the RBS 36 may identify the subchannel of the F-CPCCH in a broadcast message transmitted over a common broadcast channel.

What is claimed is:

1. A method of controlling a traffic channel data transmission rate of a mobile station in a wireless communication network, the method comprising:

providing a forward common power control channel for power controlling a plurality of mobile stations, said forward common power control channel being divided into a plurality of frames, with each frame including a plurality of power control groups and each power control group including a plurality of power control slots, each power control slot configured to carry a power control bit;

replacing the power control bits in selected power control slots with traffic channel rate control information; and transmitting said traffic channel rate control information to one or more mobile stations on the selected power control slots on the forward common power control channel.

2. The method of claim 1 wherein the selected power control slots occur at the same slot position in at least two power groups.

3. The method of claim 1 wherein the selected power control slots occur at different positions in at least two power control groups.

4. The method of claim 1 further comprising selecting one or more power control slots on the forward common power control channel for transmitting said traffic channel rate control information.

5. The method of claim 4 wherein selecting one or more power control slots on the forward common power control channel for transmitting said traffic channel rate control information comprises dynamically selecting power control slots responsive to changes in the number of mobile stations being controlled.

6. The method of claim 1 wherein transmitting said traffic channel rate control information to one or more mobile stations on selected power control slots on the forward common power control channel comprises transmitting common rate control bits to two or more mobile stations in selected power control slots designated for common rate control.

7. The method of claim 1 wherein transmitting said traffic channel rate control information to one or more mobile stations on selected power control slots on the forward common power control channel comprises transmitting dedicated rate control bits to one or more selected mobile stations in respective power control slots for each mobile station.

8. The method of claim 7 wherein transmitting dedicated traffic channel rate control bits to one or more selected mobile stations in respective power control slots for each mobile station comprises transmitting said dedicated rate control bits for different mobile stations in different power control slots.

9. The method of claim 8 wherein transmitting said traffic channel rate control information to one or more mobile stations on selected power control slots on the forward common power control channel further comprises transmitting common rate control bits to two or more mobile stations in selected power control slots designated for common power control.

10. The method of claim 1 wherein transmitting said traffic channel rate control information to one or more mobile stations on selected power control slots on the forward common power control channel comprises transmitting traffic channel rate control bits in the selected power control slots.

11. The method of claim 10 wherein transmitting said traffic channel rate control information to one or more mobile stations on selected power control slots on the forward common power control channel further comprises repeating the traffic channel rate control bits in different power control slots.

12. The method of claim 1 further comprising transmitting a common power control assignment to said mobile stations that identifies the selected power control slots.

13. The method of claim 12 wherein transmitting a common power control assignment to said mobile stations that identifies the selected power control slots comprises transmitting the common power control assignment to the mobile stations at call setup.

14. The method of claim 12 wherein transmitting a common power control assignment to said mobile stations that identifies the selected power control slots comprises transmitting the common power control assignment to the mobile station responsive to a handoff.

15. The method of claim 12 wherein transmitting a common power control assignment to said mobile stations that identifies the selected power control slots comprises transmitting the common power control assignment a plurality of mobile stations over a common broadcast channel.

16. The method of claim 1 wherein the selected slots are within a single PCG in each frame.

17. A radio base station in a wireless communication network comprising:
    a receiver to receive signals over a traffic channel from one or more mobile stations at variable traffic channel data transmission rates;
    a transmitter configured to transmit traffic channel rate control information to said one or more mobile stations to control said traffic channel data transmission rates of said mobile stations in selected power control slots on a forward common power control channel, said forward power control channel being divided into a plurality of frames with each frame having a plurality of power control groups and each power control group having a plurality of power control slots, each power control slot configured to carry a power control bit; and
    a controller communicatively connected to said transmitter and said receiver, and configured to:
        determine what traffic channel rate control information to transmit; and
        replace the power control bits in the selected power control slots with the traffic channel rate control information for transmission to the one or more mobile stations.

18. The radio base station of claim 17 wherein the selected power control slots occur at the same slot position in at least two power groups.

19. The radio base station of claim 17 wherein the selected power control slots occur at different positions in at least two power control groups.

20. The radio base station of claim 17 wherein the controller dynamically selects the power control slots.

21. The radio base station of claim 17 wherein the traffic channel rate control information comprises common rate control bits transmitted to two or more mobile stations in selected power control slots designated for common rate control.

22. The radio base station of claim 17 wherein the traffic channel rate control information comprises dedicated rate control bits transmitted to one or more stations in respective power control slots on the forward common power control channel.

23. The radio base station of claim 22 wherein said dedicated rate control bits for different mobile stations are transmitted in different power control slots.

24. The radio base station of claim 17 wherein the traffic channel rate control information comprises common rate control bits transmitted to two or more mobile stations in a first set of selected power control slots designated for common rate control, and dedicated rate control bits for one or more mobile stations in a second set of selected power control slots.

25. The radio base station of claim 17 wherein said traffic channel rate control information comprises traffic channel rate control bits.

26. The radio base station of claim 25 wherein said traffic channel rate control bits are repeated in different power control slots.

27. The radio base station of claim 17 wherein said controller assigns said mobile stations to selected power control slots for purposes of reverse link rate control and wherein said transmitter transmits a rate control assignment to said mobile stations responsive to said controller that identifies the selected power control slots to be used by the mobile stations for reverse link rate control.

28. The radio base station of claim 27 wherein the rate control assignment is sent to the mobile stations at call setup.

29. The radio base station of claim 27 wherein the rate control assignment is sent to the mobile stations responsive to a handoff.

30. The radio base station of claim 17 wherein the transmitter transmits a rate control assignment over a common broadcast channel identifying the selected power control slots on the forward common power control channel allocated for common rate control.

31. A mobile station in a wireless communication network comprising:
- a transmitter to transmit signals over a traffic channel at variable data transmission rates;
- a receiver configured to receive traffic channel rate control information from a radio base station in selected power control slots on a forward common power control channel, said forward power control channel being divided into a plurality of frames with each frame having a plurality of power control groups and each power control group having a plurality of power control slots, each power control slot configured to carry a power control bit, and wherein the power control bit in the selected power control slots have been replaced with the traffic channel rate control information; and
- a controller communicatively connected to said transmitter and said receiver to vary the traffic channel data transmission rate of said transmitter responsive to said traffic channel rate control information.

32. The mobile station of claim 31 wherein the selected power control slots occur at the same slot position in at least two power groups.

33. The mobile station of claim 31 wherein the selected power control slots occur at different positions in at least two power control groups.

34. The mobile station of claim 31 wherein the traffic channel rate control information comprises common rate control bits transmitted to said mobile station in selected power control slots designated for common rate control.

35. The mobile station of claim 31 wherein the traffic channel rate control information comprises dedicated rate control bits transmitted to said mobile station in selected power control slots on the forward common power control channel.

36. The mobile station of claim 31 wherein said traffic channel rate control information comprises traffic channel rate control bits.

37. The mobile station of claim 36 wherein said traffic channel rate control bits are repeated in different power control slots.

38. The mobile station of claim 31 wherein said mobile station receives a rate control assignment from a radio base station that identifies the selected power control slots to be used by the mobile station for reverse link rate control.

39. The mobile station of claim 38 wherein the rate control assignment is received at call setup.

40. The mobile station of claim 38 wherein the rate control assignment is received responsive to a handoff.

41. The mobile station of claim 31 wherein the rate control assignment is received over a common broadcast channel.

42. The mobile station of claim 31 wherein the controller is programmed to respond to power control bits in a designated slot in a power control group, and wherein the controller is programmed to ignore the designated slots for power control purposes when the designated slot is used for sending traffic channel rate control information.

* * * * *